May 5, 1925. 1,536,688
I. R. OSBORN
ELECTRIC FLATIRON CONNECTION
Filed March 29, 1924
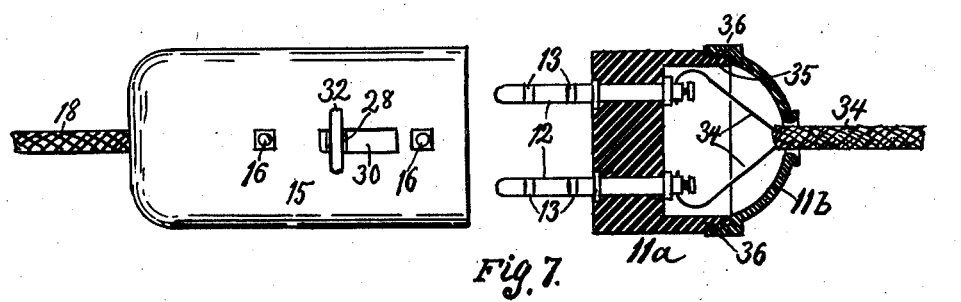
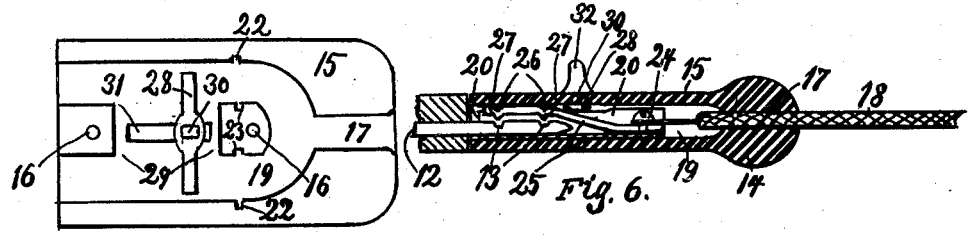
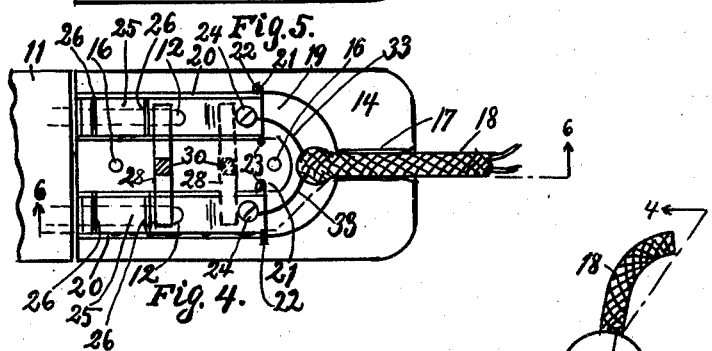
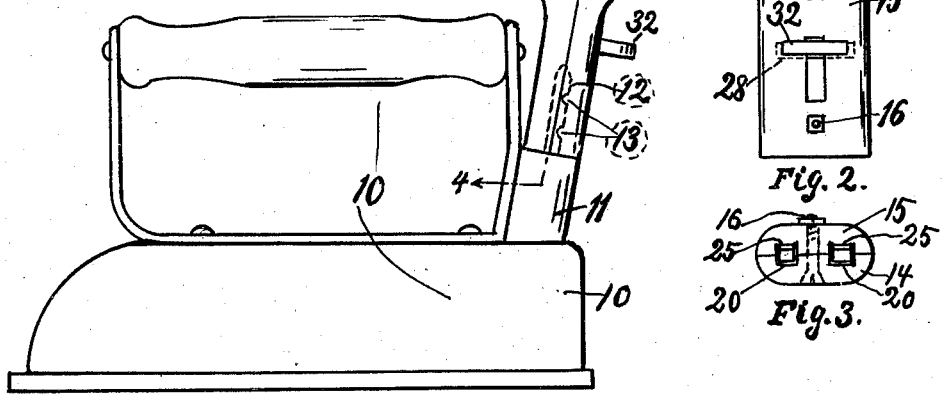
INVENTOR:
Ivyal R. Osborn.
By A. M. Carlsen,
Attorney.

Patented May 5, 1925.

1,536,688

UNITED STATES PATENT OFFICE.

IVYAL R. OSBORN, OF RIVER FALLS, WISCONSIN.

ELECTRIC FLATIRON CONNECTION.

Application filed March 29, 1924. Serial No. 702,773.

*To all whom it may concern:*

Be it known that I, IVYAL R. OSBORN, a citizen of the United States, residing at River Falls, in the county of Pierce and State of Wisconsin, have invented certain new and useful Improvements in Electric Flatiron Connections, of which the following is a specification.

My invention relates to electric connections or couplings for flat irons and other devices; and the main object is to provide a coupling that can be easily uncoupled without applying pulling strain to the members of the coupling to cause certain springs to yield and allow parting of the members. In couplings heretofore constructed such pulling has been necessary and is injurious to the members and more so to the electric cable secured to one of the members, since that is usually taken hold of during the pulling with the result that the cable or its insulating wear out in a short time near or in the member. This trouble is especially easy to notice on electrically heated flat irons. I have therefore in my drawing illustrated my invention as applied to a flat iron.

In the drawing:

Fig. 1 is a side elevation of a flat iron having an electric cable attached to it by my coupling device.

Fig. 2 is a rear elevation of the main coupling member in Fig. 1.

Fig. 3 is a bottom end view of Fig. 2.

Fig. 4 is an enlarged section on line 4—4 in Fig. 1 of the detachable coupling member and a portion of the coupling member fixed on the flat iron intact.

Fig. 5 is an inside view of the cover or half of the detachable member removed from Fig. 4.

Fig. 6 is a section on the line 6—6 in Fig. 4 with the cover Fig. 5 secured in its place.

Fig. 7 is a partly sectional view showing the invention applied as an electric circuit coupling in general.

Referring to the drawing by reference numerals, 10 designates a flat iron to be heated by electricity. It has what may be called a permanent coupling member 11, with two projecting rigid tongues 12 each with two side notches 13. The second coupling member is detachable from the permanent member and is preferably composed of a body section 14 and a cover section 15 secured together by bolts 16. The adjacent faces of the sections have meeting grooves 17 forming a channel for an electric cable 18 to enter. The sections also have cavities 19 the deepest one of which is in the body section 14.

The last mentioned cavity is about U-shaped and in each arm of the U is fitted a channel piece 20 made of sheet brass or copper and having at one end lateral wings 21 engaging in notches 22 and 23 to prevent sliding movement of the channel (as best shown in Figs. 4 and 5).

In the inner end of each channel is secured by a screw 24 one end of a resilient flat and goose neck shaped arm 25 having two depressions 26 of such depth as to produce teeth 27 at the inner side of the arm. Said teeth are arranged to engage in the notches 13 in the tongues 12 when the arm 25 is pressed toward the tongue. Such pressing is caused by a transverse actuator 28 which is movable in the space 29 in the cover (see Fig. 5) and has a stem 30 movable in a slot 31 in the cover, and beyond the latter is provided with a thumb catch 32. The cable 18 in Figs. 4 and 6 has two branches 33 each of which is held by one of the screws 24 so as to lead current into one of the resilient arms 25 and return current from the other of said arms.

In the operation it is obvious that the tongues 12 are freely and easily inserted into the channels 20 and by then moving the thumb piece 32 as from right to left in Figs. 4 and 6 the actuator 28 will close the arm 25 against the tongues 12, and the teeth 27 being thereby engaged in the notches 13 of the tongues the latter cannot be accidentally withdrawn but must remain locked until the operator pushes the button or catch 32 back again over the downwardly offset parts of the spring arms held by screws 21. When this is done the tongues 12 may be removed without any resistance to weaken the parts.

In Fig. 7 the coupling member 14—15 in Figs. 4–5 is turned end for end and instead of the member 11 being permanent on the flat iron I have shown it a common electric coupling member 11$^a$, having the notched tongues 12 connected by wires 34 to a cable 34 which may thus form an extension between any two points of a circuit.

In said Fig. 7 the part 11$^a$ may be of porcelain and the cap 11$^b$ threaded at 35 may be of hard rubber and have a knurled peripheral face 36 to engage with the fingers in turning it.

What I claim is:

An electric cable connection comprising two coupling members, one of which has two contact tongues with lateral notches, the other member having openings in which to receive said tongues, a metallic channel secured in each opening and having an offset resilient arm secured with one end to the inner end of the channel and to the electric cable in said member, the other end portion having at its bottom side teeth arranged to interlock in the notches of the tongues, said coupling member having a longitudinal slot, a finger operated catch slidable upon the slotted side of the coupling member and having a neck slidable in the slot and provided with an actuating element movable upon the resilient arms to press their teeth into the notches of the tongues when the catch is moved toward the swinging end of the resilient arm and to permit the arm to spring away from the tongues when the catch is moved in the opposite direction.

In testimony whereof I affix my signature.

IVYAL R. OSBORN.